Dec. 22, 1964 P. VAN DER LELY 3,162,448

GRAMOPHONE COMPRISING A TURNTABLE

Filed March 14, 1961

INVENTOR
PIET VAN DER LELY

BY Frank R.
AGENT 3,162,448

GRAMOPHONE COMPRISING A TURNTABLE

Piet van der Lely, Emmasingel, Eindhoven, Netherlands, assignor to North American Philips Company, Inc., New York, N.Y., a corporation of Delaware Filed Mar. 14, 1961, Ser. No. 95,680
Claims priority, application Netherlands Mar. 14, 1960
8 Claims. (Cl. 274—10)

This invention relates to record players comprising a turntable on which a changing pin may be mounted so that the pin is driven in the direction of rotation by the turntable and the operating member for the changing mechanism of the pin projects below the turntable. A structure of the above-mentioned kind is known in which the changing pin, including the operating member, is centered in the hollow shaft of the turntable. In connection therewith the bearing of the turntable is matched to the possibility of centering and operating the changing pin.

The invention is characterised in that the operating member is arranged eccentrically so that the bearing need not be modified or matched for centering and operating the changing pin, resulting in complete freedom in the choice of the bearing. This is very important since the quality of the sound reproduction is dependent upon a satisfactory bearing of the turntable.

According to a further feature of the invention, the operating member preferably comprises a roller which, due to the rotation of the turntable, can be periodically influenced by the changing mechanism.

It is common practice in a record player to form the one part of the bearing for the turntable as a sleeve connected to the turntable. When using a bearing of this structure, the sleeve projects above the surface of the turntable and the projecting part serves also to centre the changing pin.

Such a structure affords the advantage that use may be made of a pivot bearing above the level of the turntable, so that a stable bearing is obtained and the projecting part may also serve to centre the changing pin.

The invention also relates to a record player suited for use as a record changer and which for this purpose is provided with a changing pin according to the invention.

The invention also relates to a separate changing pin for use in combination with a record player according to the invention. This changing pin is characterised in that the operating member is arranged eccentrically and the changing pin is provided with a centering aperture.

In order that the invention may be readily carried into effect, it will now be described in detail, by way of example, with reference to the accompanying diagrammatic drawing, in which.

Figure 1:
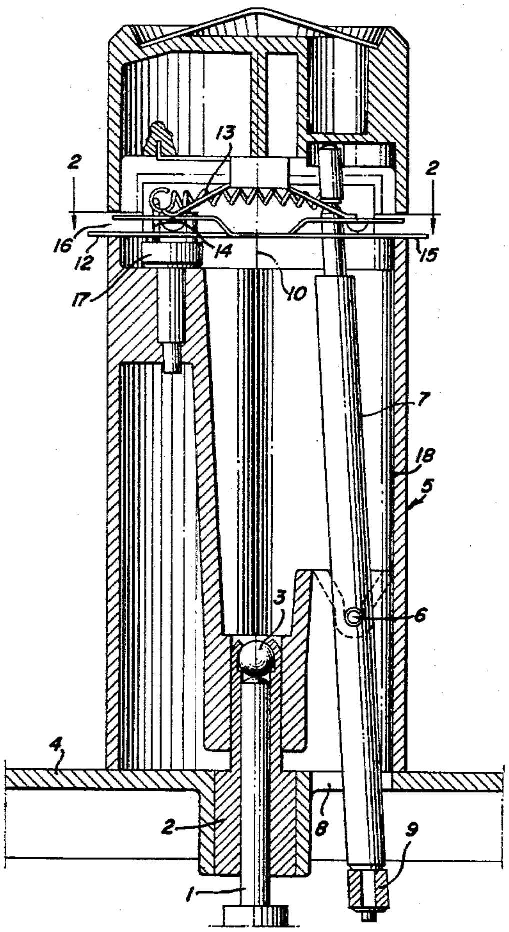
FIG. 1 shows a longitudinal section of a turntable provided with a changing pin for a record player according to the invention.
Figure 2:
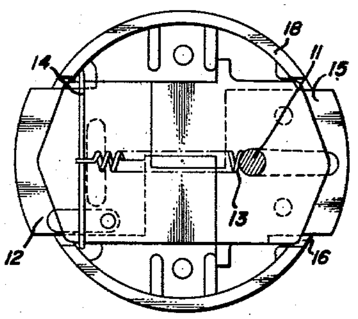
FIG. 2 is a cross-sectional view of FIG. 1.

Bearing on a shaft 1 is a ball 3 flanged in position in a sleeve 2 and forming the pivot of a turntable bearing. The sleeve 2, secured in a turntable 4, serves to centre a changing pin 5. A rod 7 arranged in a housing 18 of the changing pin can pivot at point 6 in a plane passing through the axis 10. One extremity of the rod 7, which extends through an aperture 8 of the turntable 4, is provided with a roller 9, whereas its other extremity extends through an aperture 11 of a support 12 and is drawn towards the centre of the changing pin by means of a spring 13 secured to rod 14. Two supports 12 and 15 are slidably arranged in a groove 16 of the housing 18 and are Z-shaped so that their parallel parts are located in pairs in one plane. The two supports 12 and 15 are coupled together by means of a tumbler 17 which is pivotally secured in the housing 18 and also pivotally secured to the supports 12 and 15.

When the roller 9 is pushed to the left by the changing mechanism, the rod 7 pushes the support 12 to the right, resulting in the right-hand part thereof sliding between the lowest record of the stack and the remainder of the stack and the left-hand part releasing the lowest record. Due to the reversing movement through the tumbler 17, the support 15 slides at the same time to the left, resulting in the left-hand part thereof sliding between the lowest record and the remainder of the stack and the right-hand part releasing the lowest record which can thus fall on the turntable 4. When the roller 9 is released again, the spring 13 withdraws the rod 7, so that the two supports 12 and 15 move in the opposite direction and the stack of records drops on the lower parts of the supports 12 and 15.

As can be clearly seen from the figure, in this structure there is complete freedom in the choice of the bearing for the turntable.

What is claimed is:

1. A record player comprising a turntable having an aperture therethrough, a record changing mechanism mounted on said turntable and driven in the direction of rotation of the latter, an operating member for said record changing mechanism projecting through said aperture in the turntable and having a portion thereof located below the plane of said turntable, and means pivotally mounting said operating member whereby said member pivots in a plane substantially at right angles to the plane of said turntable, a housing enclosing said record changing mechanism, a pair of record supports adapted to support a pile of records and being movable substantially at right angles to the longitudinal axis of said housing, and one end of said operating member engaging said record supports in order to selectively release a record from said pile of records.

2. A record player comprising a turntable provided with a centrally located bearing sleeve, an aperture through said turntable located eccentrically with respect to the central axis of said bearing sleeve, said bearing sleeve having a part projecting above the planar surface of said turntable, a record changing post adapted to be mounted on said bearing sleeve, said record changing post including an operating member which in the mounted position of said changing post on said bearing sleeve projects through said aperture in said turntable, and means pivotally mounting said operating member whereby said member pivots in a plane substantially at right angles to the plane of said turntable.

3. A record player comprising a turntable provided with a centrally located bearing sleeve, an aperture through said turntable located eccentrically with respect to the central axis of said bearing sleeve, said bearing sleeve having a part projecting above the planar surface of said turntable, a record changing post provided with a record supporting and holding member, an operating member for said supporting and holding members and a centering sleeve all mounted on said bearing sleeve, and a record changing mechanism positioned underneath said turntable for operating said operating member, said operating member projecting through said aperture and having part thereof above said turntable and the remainder below said turntable, and means pivotally mounting said operating member whereby said member pivots in a plane substantially at right angles to the plane of said turntable.

4. A record player as claimed in claim 3 wherein said operating member is provided with a roller which due to the rotation of said turntable is periodically engaged by said record changing mechanism to operate said record supporting and holding members.

5. A changing post for use in a record player provided with a turntable comprising record supporting and holding members, an operating member for said record supporting and holding members, a centering sleeve arranged in said turntable co-axially with the longitudinal axis of said changing post, said operating member located laterally relative to said centering sleeve and having a part thereof extending beyond the plane of the entrance opening of said centering sleeve, and means pivotally mounting said operating member whereby said member pivots in a plane substantially at right angles to the plane of said turntable.

6. A changing post for use in a record player provided with a turntable and a record changing mechanism as claimed in claim 5 wherein said part extending beyond the plane of said entrance opening is provided with a roller adapted to be propelled periodically by a record changing mechanism of record player.

7. A record player comprising a turntable having an aperture therethrough, a record changing mechanism mounted on said turntable and driven in the direction of rotation of the latter, an operating member for said record changing mechanism projecting through said aperture in the turntable and having a portion thereof located below the plane of said turntable provided with a roller, and means pivotally mounting said operating member whereby said member pivots in a plane substantially at right angles to the plane of said turntable and said roller, due to the rotation of said turntable, is periodically pushed by said record changing mechanism to operate said mechanism.

8. A record player as claimed in claim 7 further comprising a bearing sleeve in a second aperture of the turntable laterally displaced from said turntable aperture which contains said operating member, said bearing sleeve projecting above the surface of the turntable, said projecting part serving to center said changing mechanism.

References Cited in the file of this patent

UNITED STATES PATENTS

| | | |
|---|---|---|
| 2,868,546 | Roof | Jan. 13, 1959 |
| 2,898,116 | Falk | Aug. 4, 1959 |